Patented Feb. 10, 1942

2,272,888

UNITED STATES PATENT OFFICE 2,272,888

THERMOPLASTIC PRODUCT AND METHOD OF PRODUCING SAME

Frederick L. Kilbourne, Jr., Akron, Ohio, assignor to The Firestone Tire & Rubber Company, Akron, Ohio, a corporation of Ohio No Drawing. Application February 27, 1939, Serial No. 258,727

6 Claims. (Cl. 260—768)

This invention relates to products and methods of producing thermoplastic derivatives of vulcanized rubber.

A major object of the present invention is to provide improved methods of producing thermoplastic resins from vulcanized rubber compounds, including reclaimed rubber.

Another object is to provide compositions of matter resulting from the improved methods.

A further object is to provide improved methods of transforming vulcanized rubber scrap into thermoplastic resins (which may be pulverized) to serve as molding materials.

Another object is to provide an improved process for transforming vulcanized rubber scrap into a resin, which process can be carried out by utilizing lower temperatures, shorter time of treatment, and which is less expensive than methods heretofore used.

Another object is to provide an improved process for transforming vulcanized rubber scrap into a resin, the hardness of which may be readily controlled.

A further object is to provide an improved process for transforming vulcanized rubber scrap into a resin which may be compounded with various ingredients and/or vulcanized.

Heretofore, methods have been proposed for utilizing vulcanized scrap rubber to produce a resin, but these processes are expensive and have other attendant disadvantages. According to the present invention, the properties of the product can be very readily controlled by a simple and inexpensive process.

It has been found that a resinous product can be made by causing an acyl halide to react with soft vulcanized rubber or reclaimed rubber. Depending upon other ingredients used with this action, products of varying characteristics may be obtained. For instance, a resinous product may be obtained which may be used as a base for varnishes or paints, or by varying the character of the product, the same may be used as a molding composition or may be formed into thin sheets. The resin produced may be mixed with oils, pigments, or vulcanizing ingredients and vulcanized into articles of desired shape, or the resin may be pulverized and then molded under heat without vulcanization. By causing vulcanization during molding, the resultant product will have a higher softening temperature than otherwise.

In practicing the present invention, a soft vulcanized rubber compound or a reclaimed rubber is mixed with an acyl halide. Said mixing may be accomplished either with or without the aid of an inert solvent, such as benzol, toluol, xylol, carbontetrachloride, or the like. The chemical reaction between the components of the mixture may be greatly accelerated by heating the mixture in any way that may be desired, such as by heating in an oven, or by working on a mill, or by heating in an inert solvent. The resulting resinous product may be used as a molding material or may be milled and sheeted in known manner. Also, this resin is adaptable to incorporation in paints and varnishes. Moreover, a solution of the resin may be used to impregnate fabrics or other similar materials. If a solution of the resin is to be obtained, it is desirable to carry out the reaction in a solvent such as one of those mentioned above.

According to one embodiment of the invention, vulcanized soft rubber scrap or reclaimed rubber may be mixed with 10% to 100% of its weight of a chemical of the group called acyl halides, such, for instance, as phosgene, acetyl chloride, succinyl chloride, benzoyl chloride, or phthalyl chloride, in the presence of benzol or similar inert solvent. The mixture may then be heated to any convenient increased temperature, say to 176° to 212° F., whereupon the rubber scrap or reclaimed rubber undergoes reaction and dissolves. The reaction may be conveniently controlled by keeping the temperature constant by refluxing the solvent at atmospheric pressure or any other given pressure. The extent to which the chemical dissolution and chemical reaction takes place will be determined by the relative amounts of the vulcanized rubber scrap and the chemical reagent present. The quantity of chemical reagent required will depend upon the specific acyl halide added and upon the different ingredients of the compounded vulcanized rubber stock. When the reaction has been completed, the solvent may be removed by steam distillation or the resin may be precipitated by the addition of a non-solvent such as ethyl alcohol. The resin may be dried in an oven to remove the remaining moisture or solvent or precipitating liquid.

Example 1

An example of the above embodiment of the invention is as follows:

| | Grams |
|---|---|
| Medium gravity inner tube scrap | 1000 |
| Benzol | 5000 |
| Benzoyl chloride | 212 |

Heat approximately 2¾ hours at 212° to 221° F. Remove solvent by steam distillation. The dried resin may be milled on hot rolls or mixed with oils, pigments, or vulcanizing ingredients, if desired. It can also be pulverized on cold rolls. The milled resin or the powder can then be molded under heat and pressure or used in any other desired manner. If the resin is caused to vulcanize during molding, it will have a higher softening temperature than otherwise. The benzoyl chloride in the present example may be replaced with an equal weight of phthalyl chloride or acetyl chloride to obtain substantially the same product.

As a modification of the above-described process, the acyl halide reagent may be added to the vulcanized scrap on the mill. In this instance it is preferable to soften the scrap by a devulcanization process to permit ready milling. After the milling operation on the reagent and scrap, the mixture may be heated to about 200° to 320° F. for a short time in order to complete the chemical reaction. In some cases sufficient heat may be generated by the milling and the concurrent reaction to preclude the necessity for subsequent heating. It is to be understood, however, that in the latter case the heat treatment is uncontrolled and it is preferable to heat at constant temperature in thin sheets in a heated platen-press. If the scrap contains a high percentage of alkaline pigments, the amount of reagent required is greater than otherwise.

A typical example of a product made in this way is the following:

*Example 2*

| | Parts |
|---|---|
| Giant Number 2 peelings reclaim (open steam process) | 100 |
| Phthalyl chloride | 10 |

Mix the above ingredients on a cold mill and heat the mixture in slabs ¼ inch thick in a press for 1 hour at 302° F. The reacted material is hard and may be ground on a cold mill. It may then be extracted with water to remove water-soluble ingredients, although this step is not necessary. The material is dried, if it has been washed, and then compounded as follows:

| | Parts |
|---|---|
| Crude resin | 100 |
| Wood flour | 50-100 |
| Cotton flock | 0-50 |
| Calcium stearate | 2 |
| Para-coumarone-indene resin (grade cumar FX) | 10 |

The thermoplastic resin as compounded above may then be extruded or molded in any known manner. The hardness of a compound similar to the above composition, as measured by the Shore type "D" durometer, varies between 85 and 100.

The hardness, thermoplasticity, and other properties of the resin may be varied by varying the type of reclaimed rubber, the proportion of acyl halide employed, the time and temperature of carrying out the reaction, and the quality and amount of compounding ingredients employed.

Other typical plasticizers which may be used in place of the para-coumarone-indene resins are the following: Diethyl phthalate, stearic acid, montan wax, methyl abietate, tricresyl phosphate, chlorinated diphenyls, crude rubber, unreacted reclaimed rubber, and polymerized isobutylene. Carbon black or any similar filler pigment may be substituted for the wood flour mentioned above.

No reaction has been obtained between an acyl halide and either crude rubber or a simple rubber-sulfur vulcanizate (containing no accelerator, activator or inorganic pigment). It seems to be essential for the success of the present process that the usual compounding ingredients be present in the vulcanized rubber stock. Such ingredients are present in the ordinary scrap rubber and reclaimed rubber of commerce.

It is to be noted that the resins prepared according to the above examples may be admixed with suitable vulcanizing materials, such as sulfur with or without an added accelerator, such as lime, and heated to produce products having a higher softening point. Such a vulcanization step may be carried out concurrently with a molding process.

The term "soft vulcanized rubber," as used in the appended claims, is meant to include any soft vulcanized rubber stock (including the so-called reclaimed rubber) containing not more than 10% of combined sulfur based on the rubber hydrocarbon content of the stock, and including the usual inorganic pigments, such as zinc oxide, iron oxide, clay and whiting.

The term "compounding ingredient," as used in the appended claims, is meant to include any plasticizer, oil, resin, wax, pigment, filler, or solvent which is helpful in forming useful compositions from the resinous product of this invention for the purposes of molding, fabric impregnation, surface coating, and the like.

It is to be understood that various modifications may be resorted to within the scope of this invention, and I do not, therefore, limit the present specification to the examples cited, since they are given for illustrative purposes only. It will be obvious to those skilled in the art that the specific proportions of reagents and ingredients, temperatures and length of treatment may be varied in order to vary the properties of the finished product, without departing from the spirit of the invention.

What is claimed is:

1. The method of preparing a resin which comprises reacting about 100 parts of soft vulcanized rubber with about 10 to about 100 parts of a reagent consisting of an acyl halide, the said method comprising forming a mixture of the soft vulcanized rubber and the acyl halide, and then heating the mixture.

2. The method of preparing a resin which comprises reacting about 100 parts of soft vulcanized rubber with about 10 to about 100 parts of a reagent consisting of phthalyl chloride, the said method comprising forming a mixture of the soft vulcanized rubber and the phthalyl chloride, and then heating the mixture.

3. The method of preparing a resin which comprises reacting about 100 parts of soft vulcanized rubber with about 10 to about 100 parts of a reagent consisting of benzoyl chloride, the said method comprising forming a mixture of the soft vulcanized rubber and the benzoyl chloride, and then heating the mixture.

4. The method of preparing a resin which comprises reacting about 100 parts of soft vulcanized rubber with about 10 to about 100 parts of a reagent consisting of acetyl chloride, the said method comprising forming a mixture of the soft vulcanized rubber and the acetyl chloride, and then heating the mixture.

5. The method of vulcanizing the thermoplastic resinous reaction product of soft vulcanized rubber and a reagent consisting of an acyl halide, which method comprises mixing the said reaction product with sulfur and then heating the resulting mixture.

6. The method of vulcanizing the thermoplastic resinous reaction product of soft vulcanized rubber and a reagent consisting of phthalyl chloride, which method comprises mixing the said reaction product with sulfur and then heating the resulting mixture.

FREDERICK L. KILBOURNE, Jr.